US012044142B2

(12) United States Patent
Johansson et al.

(10) Patent No.: US 12,044,142 B2
(45) Date of Patent: Jul. 23, 2024

(54) GAS TURBINE BLADE

(71) Applicant: SIEMENS ENERGY GLOBAL GMBH & CO. KG, Munich (DE)

(72) Inventors: Bengt Johansson, Linköping (SE); Michael Crossley, South Ayrshire (GB); Xin-Hai Li, Linköping (SE); Antonio Pesare, Norrköping (SE); Daniel Nygren, Stockholm (SE); Olle Skrinjar, Åkersberga (SE); Maria Gyllenhammar, Fornåsa (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/019,163

(22) PCT Filed: Aug. 19, 2021

(86) PCT No.: PCT/US2021/046709
§ 371 (c)(1),
(2) Date: Feb. 1, 2023

(87) PCT Pub. No.: WO2022/051101
PCT Pub. Date: Mar. 10, 2022

(65) Prior Publication Data

US 2023/0313690 A1 Oct. 5, 2023

Related U.S. Application Data

(60) Provisional application No. 63/074,786, filed on Sep. 4, 2020, provisional application No. 62/706,535, filed on Aug. 24, 2020.

(51) Int. Cl.
*F01D 5/18* (2006.01)

(52) U.S. Cl.
CPC .......... *F01D 5/186* (2013.01); *F05D 2220/32* (2013.01); *F05D 2230/80* (2013.01);
(Continued)

(58) Field of Classification Search
CPC ..... F01D 5/10; F01D 5/22; F01D 5/16; F01D 5/18
See application file for complete search history.

(56) References Cited

U.S. PATENT DOCUMENTS 7,322,797 B2 * 1/2008 Lee ....................... F01D 11/006 416/193 A
10,060,262 B2 * 8/2018 Knowlton ................. F01D 5/22
(Continued)

FOREIGN PATENT DOCUMENTS

EP 3287596 A1 2/2018

OTHER PUBLICATIONS

PCT International Search Report and Written Opinion mailed Mar. 22, 2022 corresponding to PCT Application No. PCT/US2021/046709 filed Aug. 19, 2021.

*Primary Examiner* — Courtney D Heinle
*Assistant Examiner* — John S Hunter, Jr.

(57) ABSTRACT

A gas turbine blade including a root for connecting to a rotor of a gas turbine, a platform attached to the root defining a side surface and a groove formed in the side surface, and an airfoil including a metallic substrate extending from a surface of the platform to a tip, the airfoil including a pressure side and a suction side meeting at a trailing edge and a leading edge, and a platform impingement plate. The platform impingement plate includes a circumferential edge surrounding a cavity, the edge positioned to contact the platform, a plate surface positioned to from the cavity between the first surface and the plate surface, and a flat member having a face attached to the plate surface and at
(Continued)

least one end portion. A gas turbine blade including a platform sealing wire positioned in a groove of the platform is also provided.

12 Claims, 11 Drawing Sheets

(52) U.S. Cl.
CPC .... *F05D 2240/30* (2013.01); *F05D 2260/201* (2013.01); *F05D 2260/202* (2013.01)

(56) References Cited

U.S. PATENT DOCUMENTS

| | | | | |
|---|---|---|---|---|
| 10,895,156 | B2 * | 1/2021 | Hjalmarsson | F01D 5/081 |
| 2012/0082550 | A1 | 4/2012 | Harris, Jr. et al. | |
| 2015/0322804 | A1 * | 11/2015 | Butler | F01D 9/041<br>29/889.71 |

* cited by examiner

GAS TURBINE BLADE

BACKGROUND

Internal components of gas turbine engines, especially those in the hot combustion gas path, are exposed to temperatures of approximately 900 degrees Celsius or hotter. Blades and vanes in the turbine section of the gas turbine engine are among these internal components. The high temperatures often cause damage to the components, so the components are designed to utilize various cooling schemes to cool the surfaces of the blades and vanes that are exposed to the hot combustion gases. For example, blades and vanes are often constructed of high temperature superalloys coated with barrier coatings that can withstand the high temperatures. Additionally, the superalloy components often include cooling passages terminating on the component outer surface for passage of coolant fluid to cool the surfaces exposed to the hot combustion gases.

BRIEF SUMMARY

In one construction, a gas turbine blade includes a root for connecting to a rotor of a gas turbine engine, a platform attached to the root and defining a groove, a platform impingement plate, and an airfoil. The platform impingement plate includes a circumferential edge surrounding a cavity, the edge positioned to contact a first surface of the platform, a plate surface positioned to form the cavity between the first surface and the plate surface, and a flat member having a face attached to the plate surface and at least one end portion. The plate surface includes at least one impingement hole through which a fluid flow flows to cool the first surface of the platform. Each end portion extends beyond the plate surface and includes a curvature so that the curved end portion is inserted into the groove. The airfoil includes a metallic substrate extending from a second surface of the platform opposite the first surface to a tip, the airfoil including a pressure side and a suction side, the pressure side and the suction side meeting at a trailing edge and a leading edge.

In another construction, a gas turbine blade includes a root for connecting to a rotor of a gas turbine engine, a platform attached to the root defining a side surface and a groove formed in the side surface, a platform sealing wire positioned in the groove, and an airfoil including a metallic substrate extending from a surface of the platform to a tip, the airfoil including a pressure side and a suction side, the pressure side and the suction side meeting at a trailing edge and a leading edge. The sealing wire includes a first curved portion and a second flat portion so that the platform sealing wire has a D-shaped cross section.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
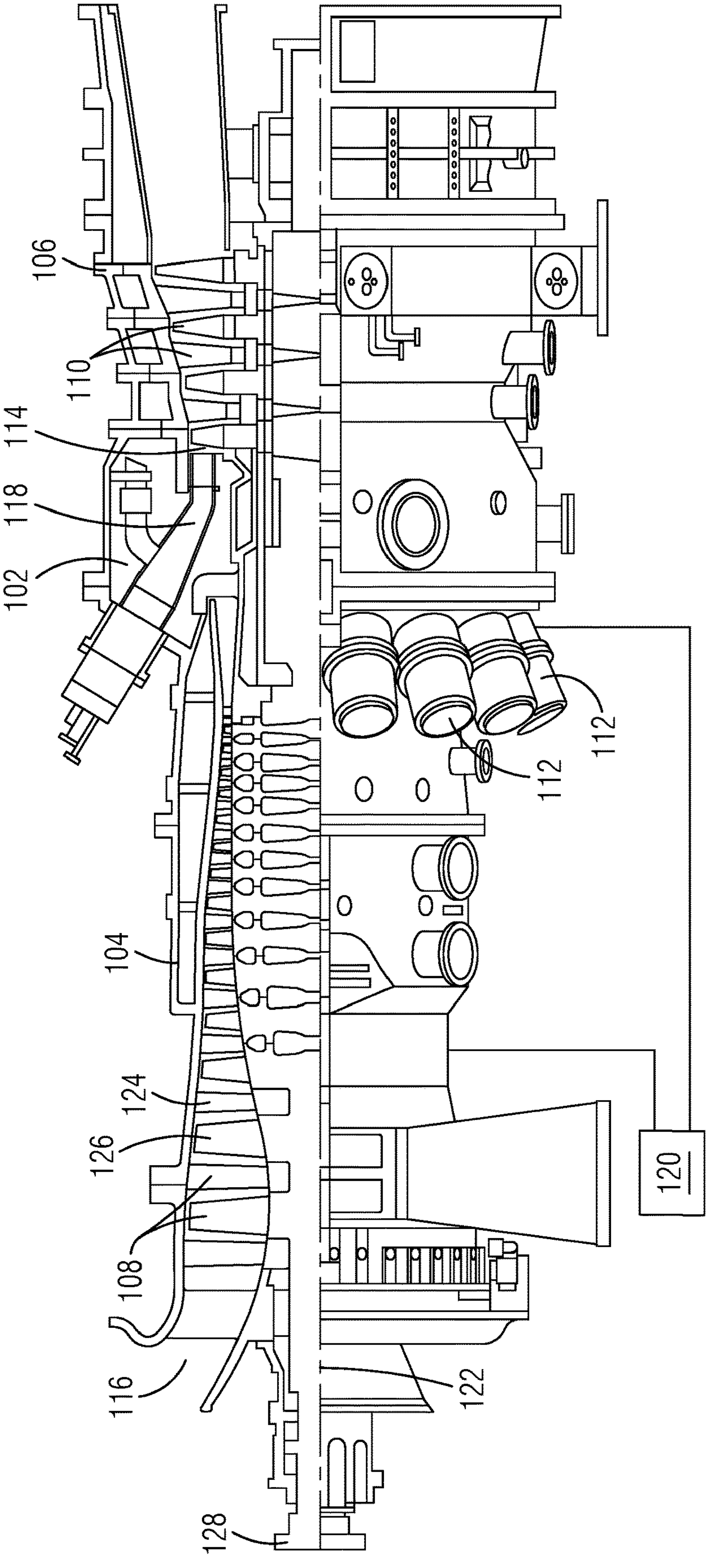
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 104, a combustion section 102, and a turbine section 106 arranged along a central axis 122. The compressor section 104 includes a plurality of compressor stages 108 with each compressor stage 108 including a set of turbine blades 126 and a set of stationary vanes 124 or adjustable guide vanes. A rotor 128 supports the turbine blades 126 for rotation about the central axis 122 during operation. In some constructions, a single one-piece rotor 128 extends the length of the gas turbine engine 100 and is supported for rotation by a bearing at either end. In other constructions, the rotor 128 is assembled from several separate spools that are attached to one another or may include multiple disk sections that are attached via a bolt or plurality of bolts.

The compressor section 104 is in fluid communication with an inlet section 116 to allow the gas turbine engine 100 to draw atmospheric air into the compressor section 104. During operation of the gas turbine engine 100, the compressor section 104 draws in atmospheric air and compresses that air for delivery to the combustion section 102. The illustrated compressor section 104 is an example of one compressor section 104 with other arrangements and designs being possible.

In the illustrated construction, the combustion section 102 includes a plurality of separate combustors 112 that each operate to mix a flow of fuel with the compressed air from the compressor section 104 and to combust that air-fuel mixture to produce a flow of high temperature, high pressure combustion gases or exhaust gas 118. Of course, many other arrangements of the combustion section 102 are possible.

The turbine section 106 includes a plurality of turbine stages 110 with each turbine stage 110 including a number of rotating turbine blades 126 and a number of stationary blades or vanes. The turbine stages 110 are arranged to receive the exhaust gas 118 from the combustion section 102 at a turbine inlet 114 and expand that gas to convert thermal and pressure energy into rotating or mechanical work. The turbine section 106 is connected to the compressor section 104 to drive the compressor section 104. For gas turbine engines 100 used for power generation or as prime movers, the turbine section 106 is also connected to a generator, pump, or other device to be driven. As with the compressor section 104, other designs and arrangements of the turbine section 106 are possible.

A control system 120 is coupled to the gas turbine engine 100 and operates to monitor various operating parameters and to control various operations of the gas turbine engine 100. In preferred constructions the control system 120 is typically micro-processor based and includes memory devices and data storage devices for collecting, analyzing, and storing data. In addition, the control system 120 provides output data to various devices including monitors, printers, indicators, and the like that allow users to interface with the control system 120 to provide inputs or adjustments. In the example of a power generation system, a user may input a power output set point and the control system 120 may adjust the various control inputs to achieve that power output in an efficient manner.

The control system 120 can control various operating parameters including, but not limited to variable inlet guide vane positions, fuel flow rates and pressures, engine speed, valve positions, generator load, and generator excitation. Of course, other applications may have fewer or more controllable devices. The control system 120 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
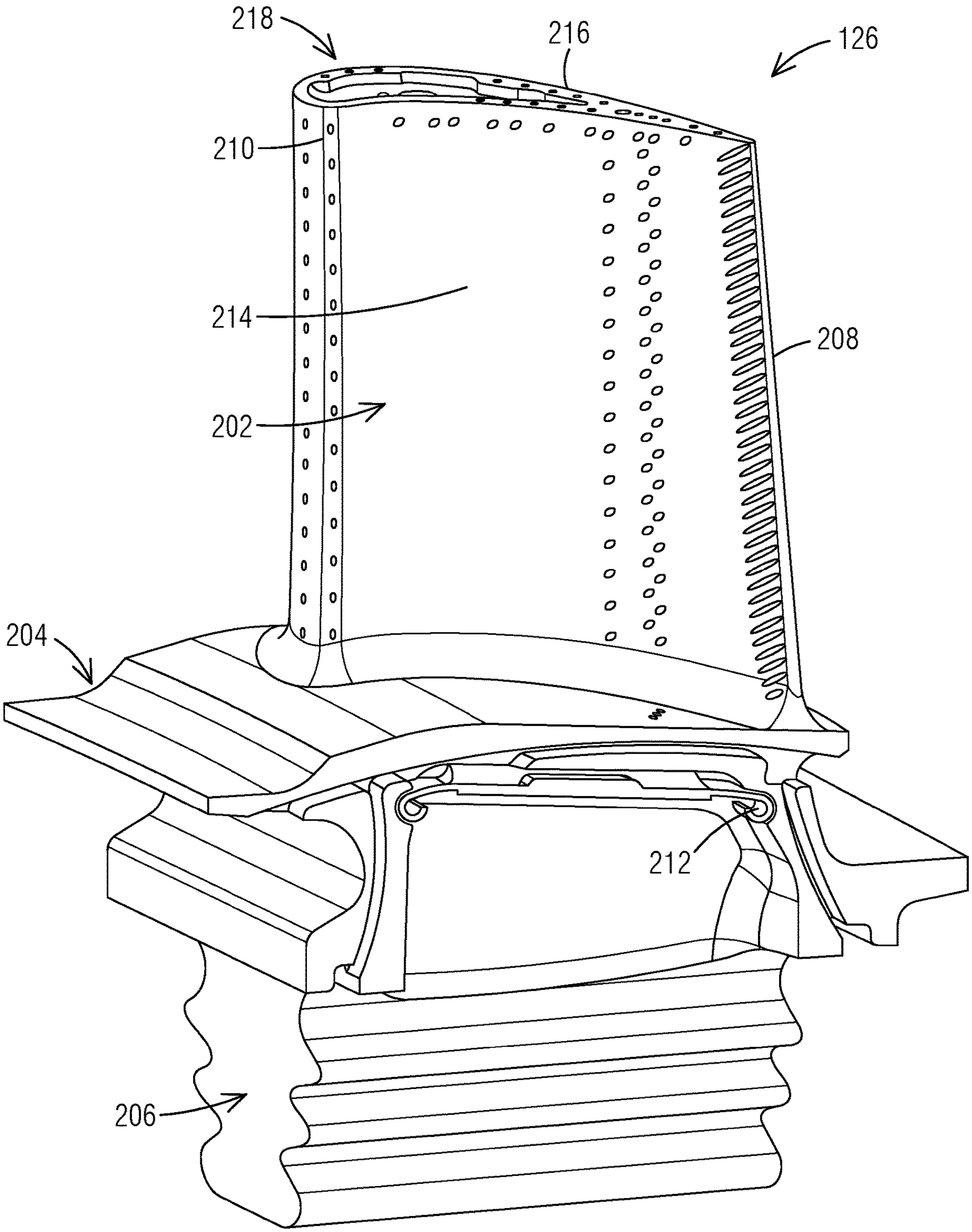
FIG. 2 is a perspective view of a turbine blade including a platform impingement plate.

FIG. 2 illustrates a perspective view of a turbine blade 126 as may be found in a gas turbine engine 100. The turbine blade 126 includes an airfoil 202, a platform 204, and a root 206. The root 206 may be connected to a rotor 128 of the gas turbine engine 100. A platform 204 is formed at a radially outward portion of the root 206 and is in between the root 206 and the airfoil 202. The airfoil 202 is attached to the platform 204 and extends in a radial direction outwards from the platform 204 to a tip 218. The airfoil 202 includes an outer surface having a pressure side 214 and a suction side 216. The pressure side 214 and suction side meet at an upstream leading edge 210 and a downstream trailing edge 208. The terms 'leading' and 'trailing' are used in relation to a fluid flow of the working flow of the gas turbine engine 100. In an embodiment, a platform impingement plate 212 is shown in FIG. 2 residing on the side of the platform 204 facing the root 206 and opposite the airfoil 202.

Figure 3:
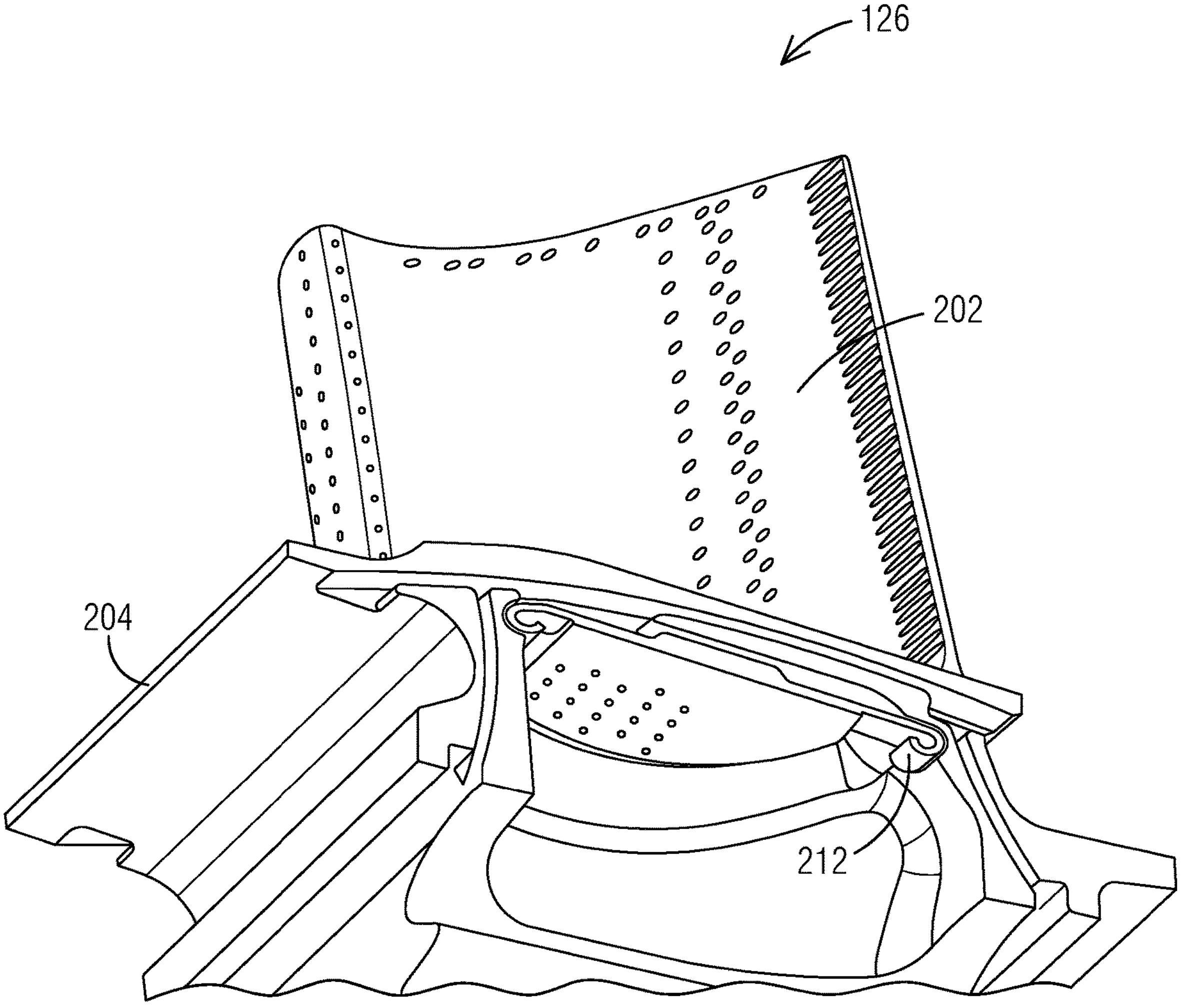
FIG. 3 is a further perspective view of a turbine blade including a platform impingement plate.

FIG. 3 shows a further view of the platform impingement plate 212. The platform impingement plate 212 attaches to a first surface of the platform facing the root 206 and on the surface opposite the surface of the platform from which the airfoil 202 extends. Additionally, the platform impingement plate 212 resides on the pressure side 214 of the turbine blade 126.

Figure 4:
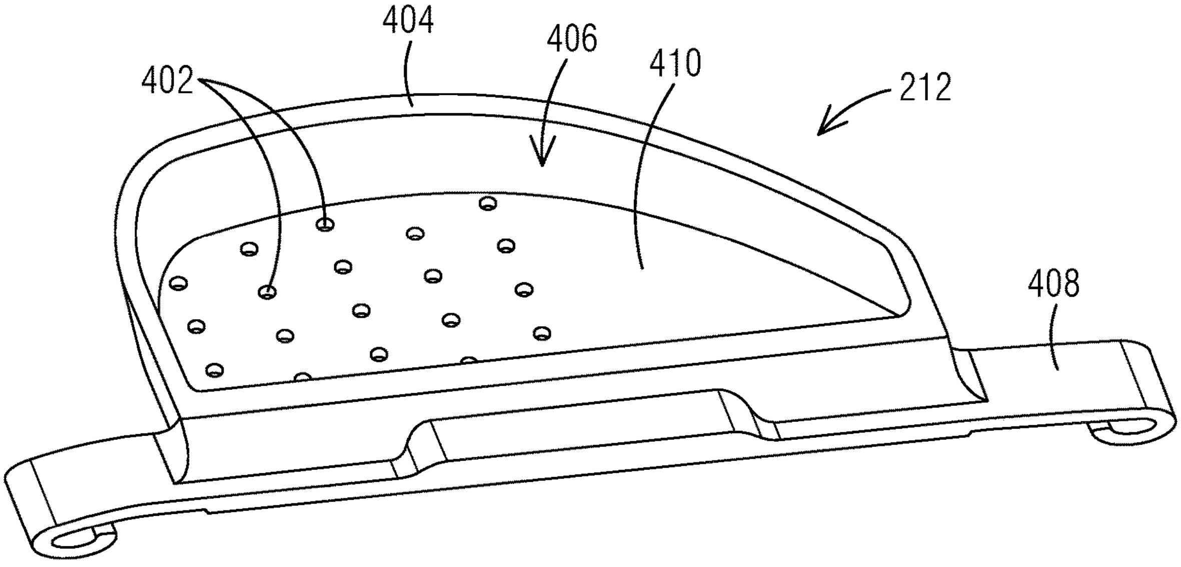
FIG. 4 is a perspective view of a platform impingement plate.

FIG. 4 shows a perspective top view of the platform impingement plate 212. The platform impingement plate 212 includes a circumferential edge 404 that contacts and is attached to the first surface of the platform 204. The circumferential edge 404 is in continuous contact with the first surface of the platform 204. The edge 404 surrounds a cavity 406, the cavity 406 defined by a plate surface 410 and the surrounding edge 404. The plate surface 410 may include at least one impingement hole 402. In an embodiment, the plate surface 410 includes more than one impingement hole 402. The impingement holes 402 enable a fluid flow to cool the first surface of the platform. The platform impingement plate 212 includes a flat member 408 having a face attached to the plate surface 410. The flat member 408 includes at least one end portion, the end portion extends beyond the plate surface 410 and includes a curved end. The curved end fits into a groove in the platform 204. An embodiment shown in FIG. 4 includes a flat member 408 having two end portions, each end portion including a curved end. Each of the curved ends fit into a corresponding groove in the platform 204 so that the platform impingement plate 212 may be attached to the platform 204. In an embodiment, the curved ends are slightly larger than the grooves so that they deform slightly when installed to hold the platform impingement plate 212 in place.

In an embodiment, the platform impingement plate 212 is additively manufactured.

Additive Manufacturing (AM) enables the manufacturing of components that are difficult to manufacture using conventional manufacturing techniques such as the curved ends of the flat member 408.

Figure 5:
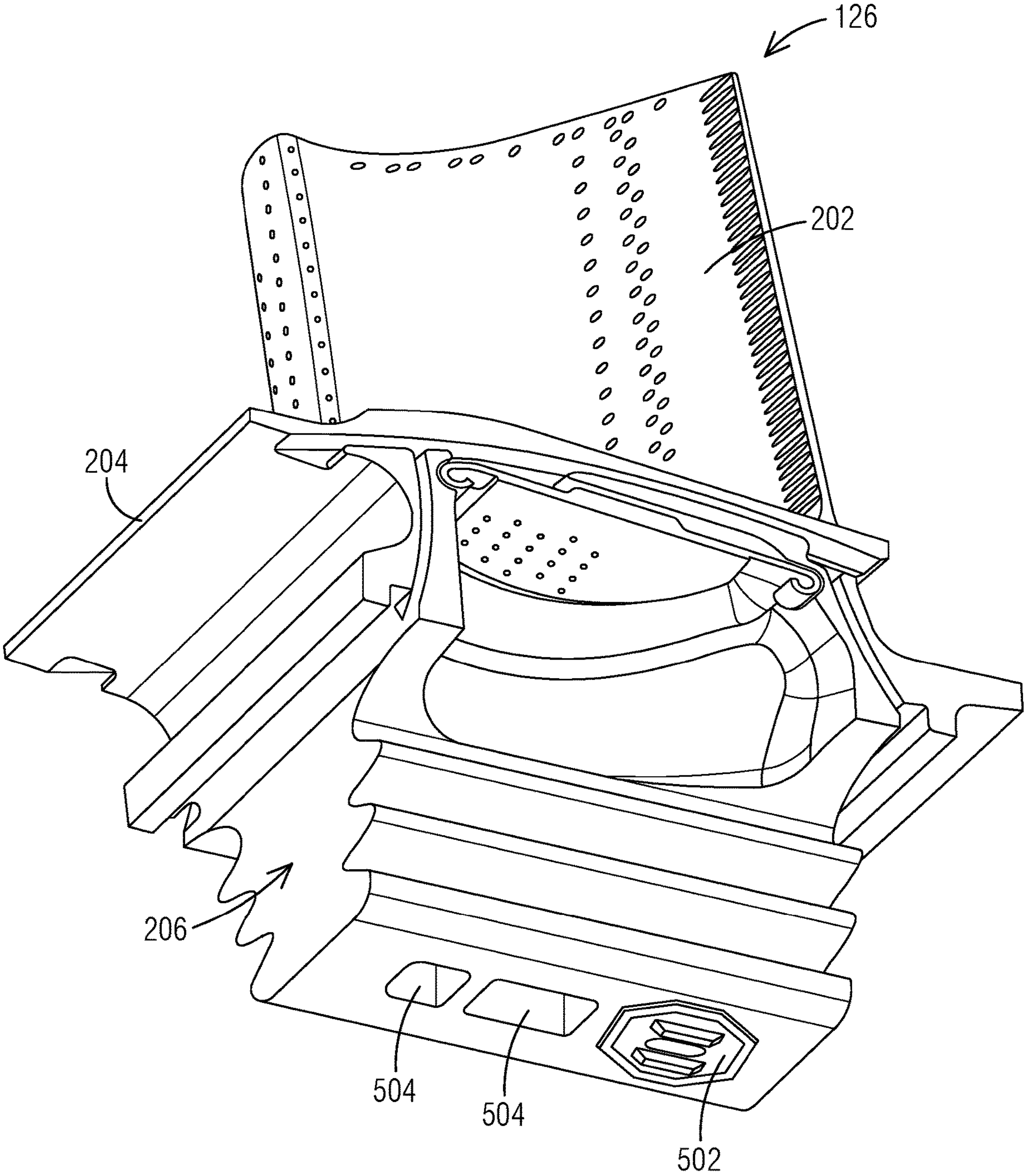
FIG. 5 is a perspective view of a turbine blade including an orifice plate.

FIG. 5 shows a perspective view of turbine blade 126 viewed so that a bottom of the root 206 may be seen. A bottom face of the root 206 includes at least one root cavity 504. In the embodiment of the turbine blade 126 shown in FIG. 5, the root 206 includes three root cavities 504. In a root cavity 504 on the far right of FIG. 5, an orifice plate 502 is shown having a plate that covers the opening into the root cavity 504.

Figure 6:
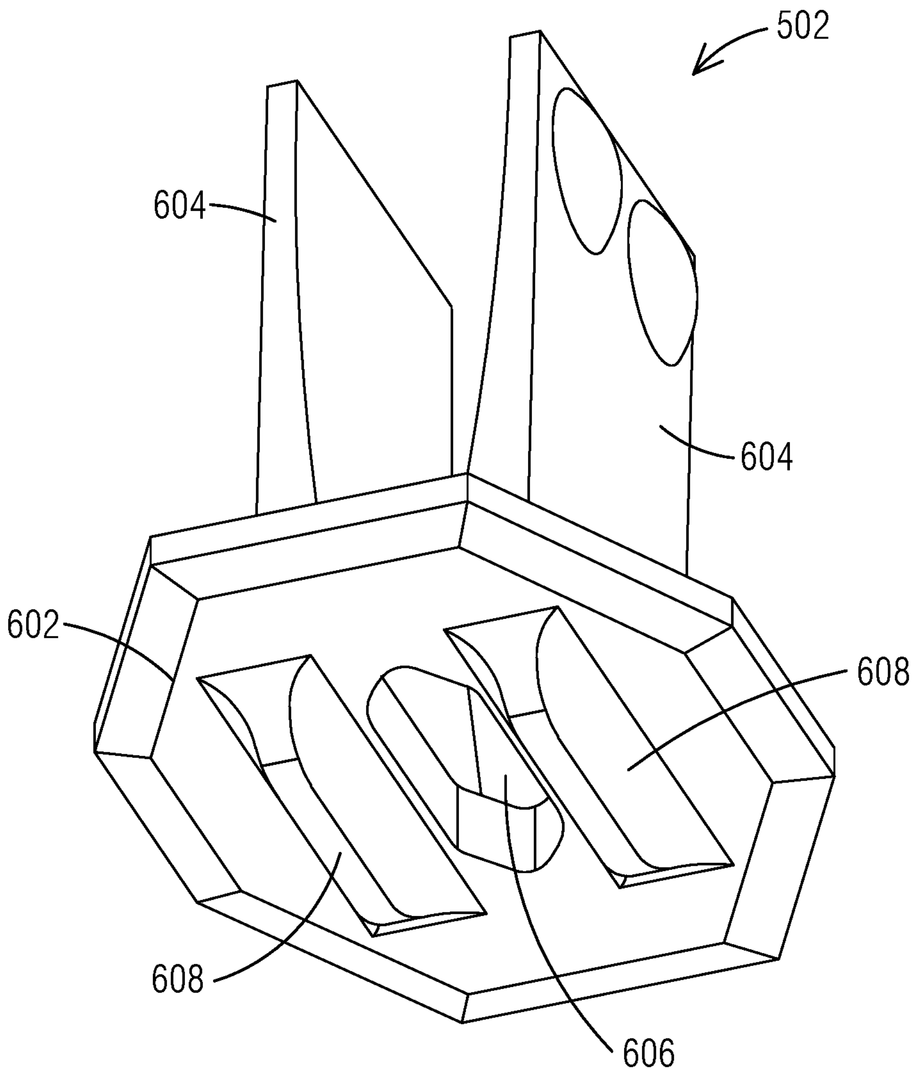
FIG. 6 is a perspective view of an orifice plate.

FIG. 6 shows a perspective view of the orifice plate 502 as shown in the root cavity 504 of root 206 in FIG. 5. The orifice plate 502 includes a plate 602 having at least one orifice 606. In the embodiment shown, the plate 602 includes an octagonal shape. Extending from a first surface of the plate 602 is at least one insertion plate 604. In the embodiment of FIG. 6, two insertion plates 604 extend from the first surface of the plate 602. The insertion plates 604 may be inserted into the root cavity 504 where they are fitted into the root cavity 504. In an embodiment, the plate 602 may include at least one fin 608 extending from a second surface of the plate 602 opposite the first surface.

Figure 7:
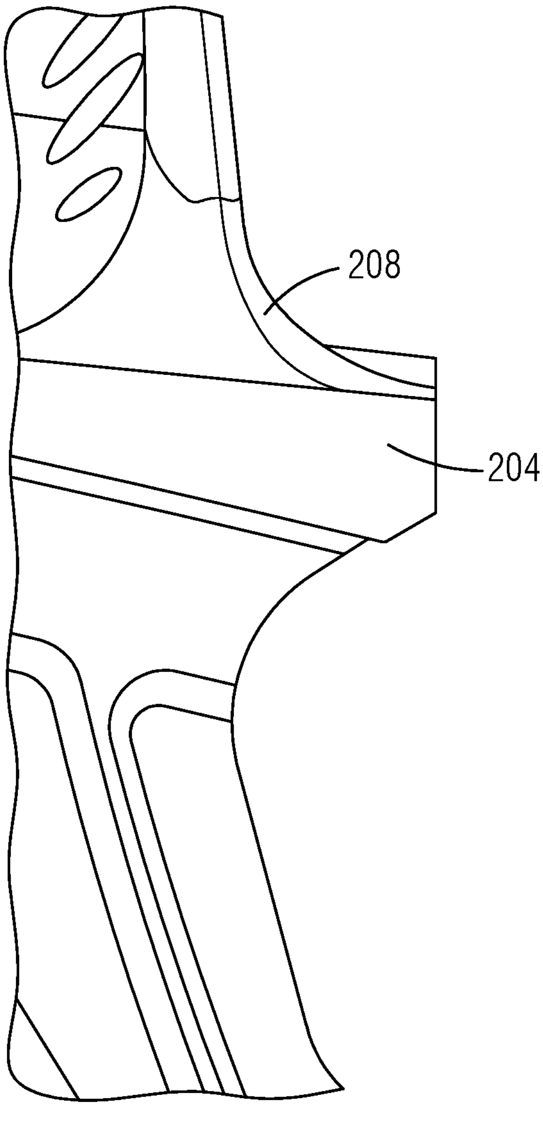
FIG. 7 illustrates a partial side view of the platform and the trailing edge.

FIG. 7 illustrates the platform 204 at the trailing edge 208. The platform 204 on the trailing edge side extends to the end of the trailing edge 208 such that it may be shorter than a traditional turbine blade. The shorter platform 204 is easier to cool and to prevent oxidation and TBC damage.

Figure 8:
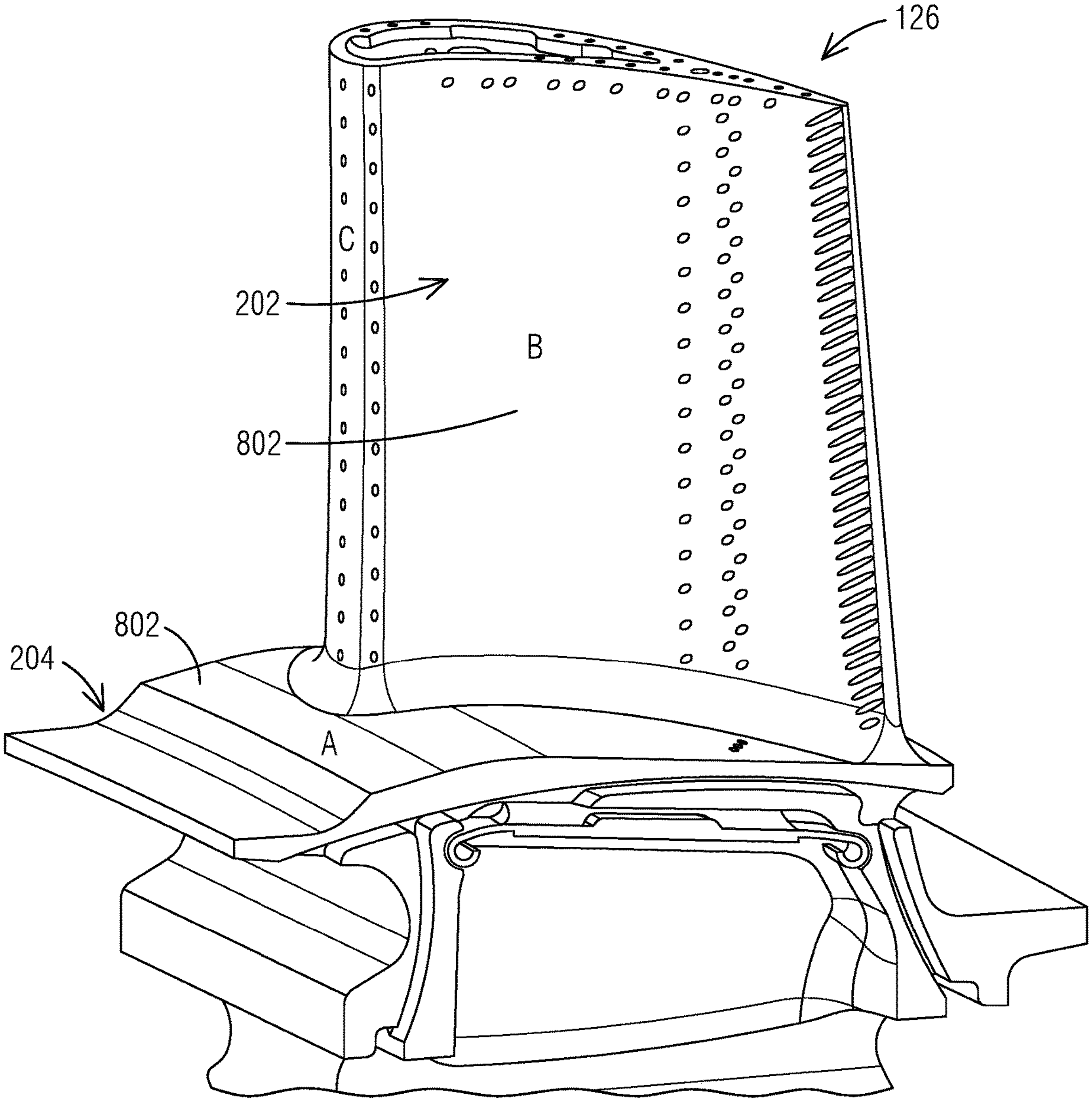
FIG. 8 is a perspective view of a turbine blade having a coating.

Turbine engine internal components, such as the turbine blade 126 shown in FIG. 8, often incorporate a thermal barrier coating (TBC) of metal-ceramic material that is applied directly to the external surface of the component substrate surface or over an intermediate metallic bond coat that was previously applied to the substrate surface. The TBC provides an insulating layer over the component substrate, which reduces the substrate temperature. FIG. 8 includes a perspective view of turbine blade 126 having a thermal protection system 802 that may include a bond coat applied to the substrate. The thermal protection system 802 may also include a thermal barrier coating applied over the bond coat as a topcoat. In an alternate embodiment, the thermal barrier coating is applied directly to the metallic substrate. In an embodiment, the thermal protection system 802 is applied to portions of the airfoil 202 and/or applied to the platform 204. For example, the bond coat may be applied to the entire airfoil substrate including the tip 218, leading edge 210, trailing edge 208, suction side 216, and pressure side 214. The bond coat may be applied to the platform 204. Surfaces included for the bond coat application may include those denoted by A, B, C, and D. In an embodiment, the bond coat comprises platinum aluminum alloy (PtAl). The topcoat may be applied by an Electron Beam Physical Vapor Deposited (EBPVD) process over the bond coat on the platform 204 and portions of the airfoil 202. In an embodiment, the topcoat is applied to the tip 218, pressure side 214, suction side 216 and leading edge 210, but not on the trailing edge 208. The thermal protection system 802, PtAl bond coat and EBPVD topcoat, has a better surface finish than air plasma sprayed (APS) coatings resulting in an efficiency advantage.

Figure 9:
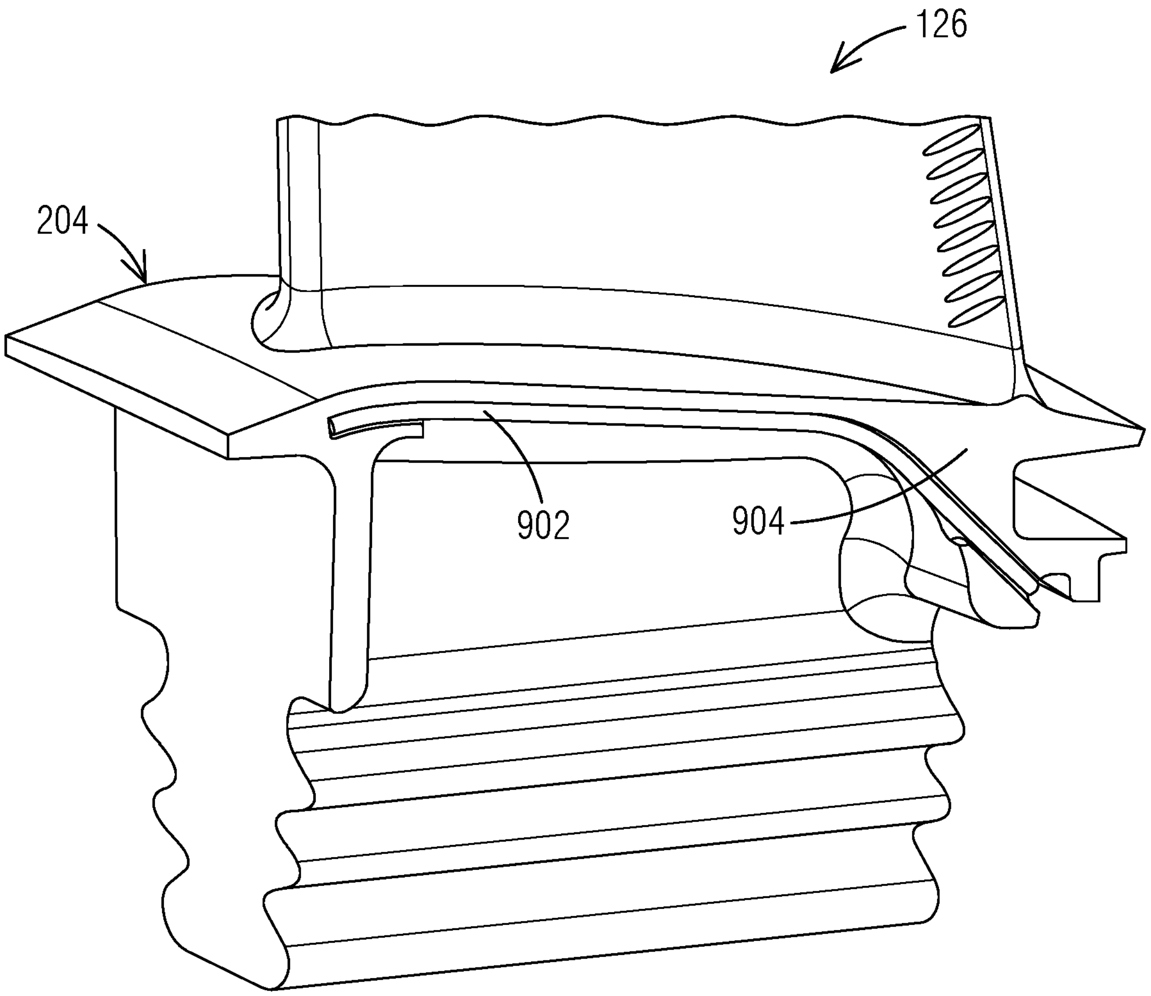
FIG. 9 is a partial perspective view of a turbine blade having a sealing wire.
Figure 10:
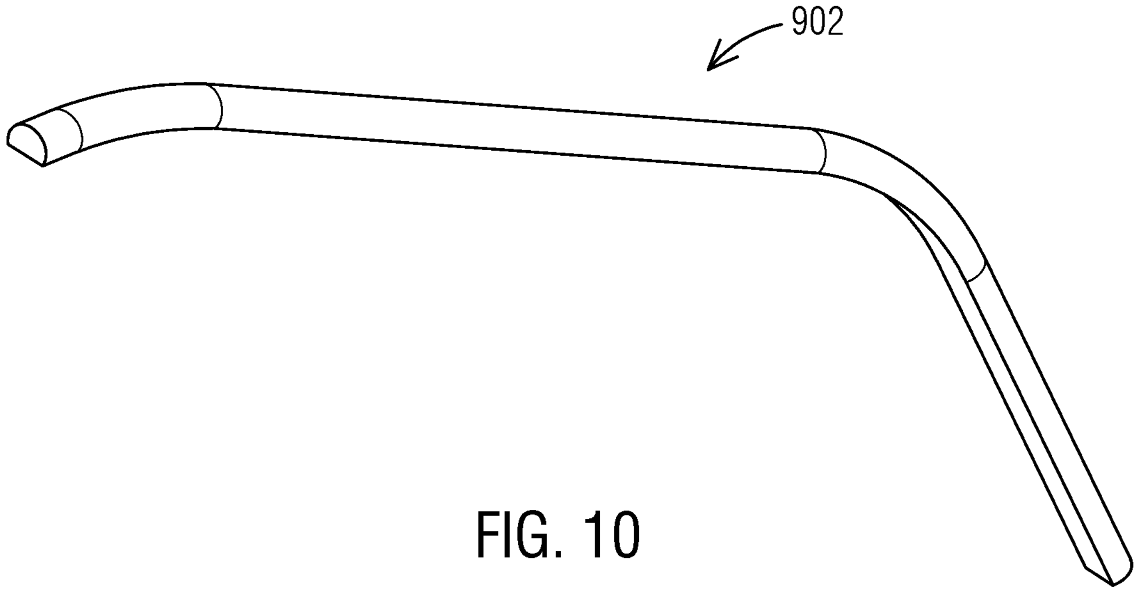
FIG. 10 is a perspective view of a sealing wire.

FIG. 9 shows a partial perspective view of a turbine blade 126 having a sealing wire 902. The turbine blade 126 in FIG. 9 includes a platform 204 including a side surface 904 with a groove formed in the side surface 904. The sealing wire 902, as shown in FIG. 10, includes a first curved portion and a second flat portion such that the sealing wire 902 includes a D-shaped cross section. The sealing wire 902 is oriented such that the second flat portion faces toward the inner diameter of the gas turbine engine. Utilizing a sealing wire instead of sealing strip, as has been utilized previously, incurs less machining to install within the platform 204 and includes a dynamic damping advantage. Specifically, the sealing wire 902 is compressed between two adjacent turbine blades 126 and is resilient such that vibrations between the turbine blade 126 are reduced.

Figure 11:
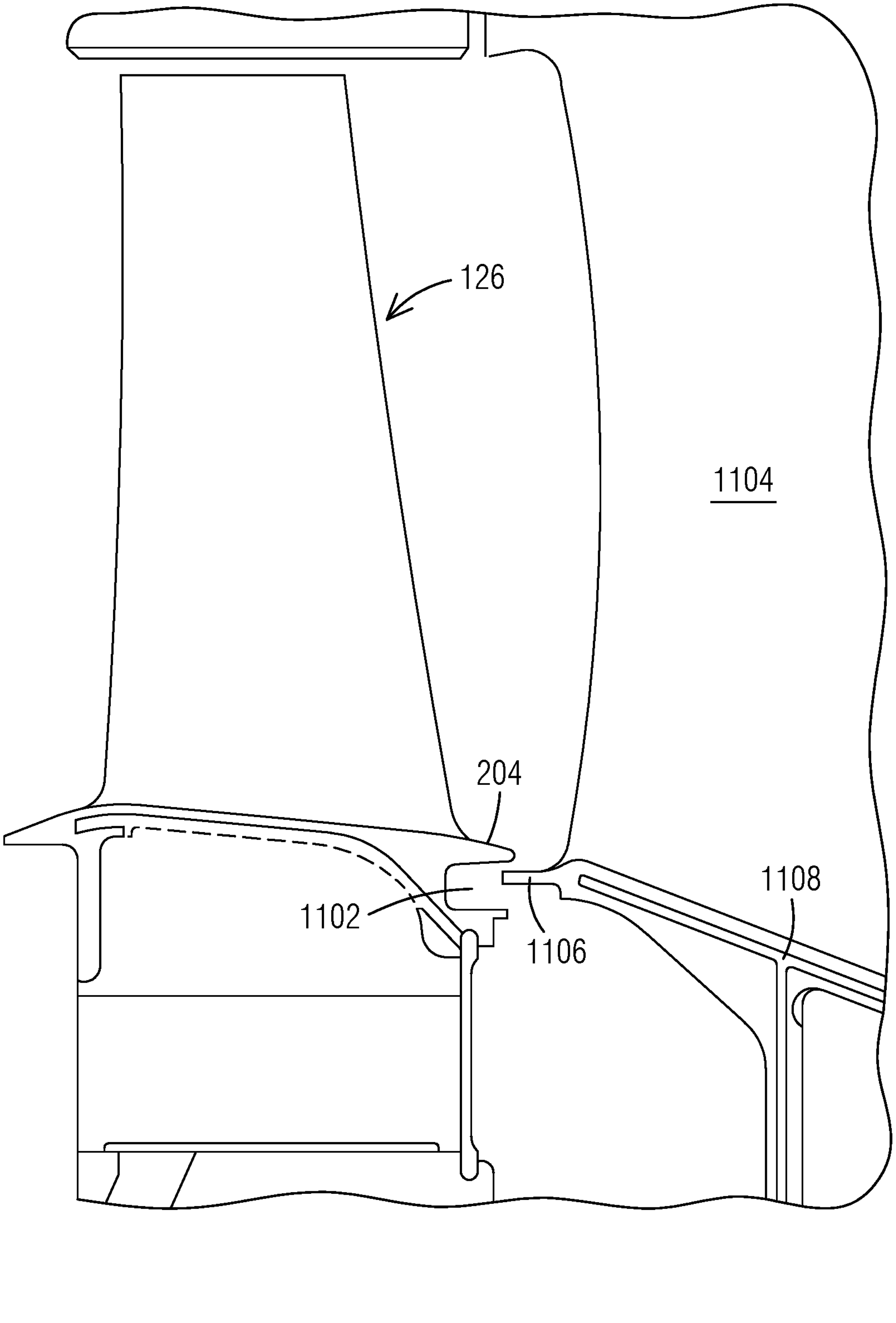
FIG. 11 is a perspective view of a turbine blade and its adjacent guide vane.

FIG. 11 illustrates a turbine blade 126 having a platform 204 with a damping cavity 1102 on the trailing edge side of the platform 204. The damping cavity 1102 receives a leading edge portion 1106 of an adjacent guide vane 1104 of the next stage. During operation of the gas turbine engine 100, the interaction of the leading edge portion 1106 with the damping cavity 1102 damps vibration. The adjacent guide vane 1104 includes a T-shaped platform 1108 that reduces hot gas ingestion into the platform cavity.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A gas turbine blade, comprising:
- a root for connecting to a rotor of a gas turbine engine;
- a platform attached to the root and defining a groove;
- a platform impingement plate, comprising:
  - a circumferential edge surrounding a cavity, the edge positioned to contact a first surface of the platform,
  - a plate surface positioned to form the cavity between the first surface and the plate surface, and
  - a flat member having a face attached to the plate surface and at least one end portion, wherein each end portion extends beyond the plate surface and includes a curvature so that the curved end portion is inserted into the groove; and
- an airfoil comprising a metallic substrate extending from a second surface of the platform opposite the first surface to a tip, the airfoil including a pressure side and a suction side, the pressure side and the suction side meeting at a trailing edge and a leading edge, wherein the plate surface includes at least one impingement hole through which a fluid flow flows to cool the first surface of the platform, wherein the airfoil further comprises a thermal protection system deposited on the substrate, the thermal protection system includes a bond coat applied to the metallic substrate and a thermal barrier coating including an EBPVD top coat applied over the bond coat on a portion of the airfoil, wherein the platform further comprises a thermal protection system deposited on the second surface, the thermal protection system including a bond coat applied to the second surface and a thermal barrier coating including an EBPVD top coat applied over the bond coat.

2. The gas turbine blade of claim 1, wherein the platform impingement plate contacts the first surface on the pressure side of the turbine blade.

3. The gas turbine blade of claim 1, wherein the platform impingement plate is additively manufactured.

4. The gas turbine blade of claim 1, wherein the root defines a cavity, and wherein an orifice plate includes a plate including an orifice and at least one insertion plate, the insertion plate fitted into the cavity in the root such that the plate covers the cavity.

5. The gas turbine blade of claim 1, wherein an orifice plate is octagonal shaped.

6. The gas turbine blade of claim 1 wherein the bond coat comprises PtAl.

7. The gas turbine blade of claim 1, wherein the portion of the airfoil includes the suction side, the pressure side, the tip and the leading edge.

8. The gas turbine blade of claim 7, wherein the bond coat comprises PtAl.

9. The gas turbine blade of claim 1, wherein the platform extends to the trailing edge on the trailing edge side of the platform.

10. A method of servicing a gas turbine engine having the blade according to claim 1 comprising: mounting the blade to the rotor.

11. The method according to claim 10, wherein the blade is mounted such that a damping cavity on a trailing edge side of a platform of the blade receives a leading edge portion of an adjacent guide vane, and wherein the guide vane has a T-shaped platform, whereby during operation of the gas turbine engine the interaction of the leading edge portion with the damping cavity dampens vibration.

12. The method according to claim 11, further comprising:

mounting the guide vane to a stator of the gas turbine engine.

* * * * *